(12) United States Patent
Gupta et al.

(10) Patent No.: US 8,853,118 B2
(45) Date of Patent: *Oct. 7, 2014

(54) PROPYLENE POLYMERIZATION CATALYST SYSTEM

(75) Inventors: Virendrakumar Gupta, Mumbai (IN); Harshad Ramdas Patil, Mumbai (IN); Dhananjay Ghelabhai Naik, Mumbai (IN)

(73) Assignee: Reliance Industries Limited, Mumbai (IN)

( * ) Notice: Subject to any disclaimer, the term of this patent is extended or adjusted under 35 U.S.C. 154(b) by 633 days.

This patent is subject to a terminal disclaimer.

(21) Appl. No.: 12/933,366

(22) PCT Filed: Aug. 25, 2008

(86) PCT No.: PCT/IN2008/000532
§ 371 (c)(1),
(2), (4) Date: Sep. 17, 2010

(87) PCT Pub. No.: WO2009/116056
PCT Pub. Date: Sep. 24, 2009

(65) Prior Publication Data
US 2011/0003952 A1    Jan. 6, 2011

(30) Foreign Application Priority Data

Mar. 18, 2008   (IN) .......................... 539/MUM/2008

(51) Int. Cl.
| | | |
|---|---|---|
| B01J 31/00 | (2006.01) | |
| B01J 37/00 | (2006.01) | |
| C08F 4/02 | (2006.01) | |
| C08F 4/60 | (2006.01) | |
| C08F 4/44 | (2006.01) | |
| C08F 2/00 | (2006.01) | |
| C08F 110/06 | (2006.01) | |
| C08F 10/00 | (2006.01) | |

(52) U.S. Cl.
CPC .............. *C08F 10/00* (2013.01); *C08F 110/06* (2013.01)
USPC ........... 502/125; 502/127; 526/142; 526/213; 526/351

(58) Field of Classification Search
USPC ................. 526/351, 142, 213; 502/125, 127
See application file for complete search history.

(56) References Cited

U.S. PATENT DOCUMENTS

| | | | | |
|---|---|---|---|---|
| 4,330,650 | A | * | 5/1982 | Sakurai et al. ................. 526/127 |
| 4,336,360 | A | * | 6/1982 | Giannini et al. ............... 526/114 |
| 5,414,063 | A | | 5/1995 | Seegar et al. |
| 6,306,973 | B1 | * | 10/2001 | Takaoka et al. ............... 525/240 |
| 2005/0106973 | A1 | * | 5/2005 | Sheldon et al. ............... 442/185 |
| 2006/0223956 | A1 | | 10/2006 | Chen |
| 2007/0032375 | A1 | | 2/2007 | Campbell, Jr. et al. |
| 2008/0161515 | A1 | * | 7/2008 | Blackmon et al. ............ 526/127 |

OTHER PUBLICATIONS

International Search Report dated Dec. 14, 2009 for related International Application No. PCT/IN2008/000532.

* cited by examiner

*Primary Examiner* — David W Wu
*Assistant Examiner* — Elizabeth Eng
(74) *Attorney, Agent, or Firm* — Klein, O'Neill & Singh, LLP

(57) ABSTRACT

The invention relates to a catalyst system for polymerization of propylene, the catalyst system comprising a Ziegler Natta procatalyst, an organoaluminium cocatalyst, a monoester of an aromatic carboxylic acid as the internal donor and ethyl-4-isopropoxy benzoate as the selectivity control agent. The invention also relates to a process for polymerization using the catalyst system as well as to polymers prepared by the process.

5 Claims, No Drawings

PROPYLENE POLYMERIZATION CATALYST SYSTEM

FIELD OF THE INVENTION

The invention relates to a catalyst system for polymerization of propylene, to a process for polymerization of propylene using the catalyst system and to polypropylene synthesised by the process.

BACKGROUND OF THE INVENTION

Polymerization of propylene is usually carried out in the presence of a catalyst system containing a Ziegler-Natta type procatalyst, an organo aluminium cocatalyst, an internal electron donor and a selectivity control agent. Depending upon the kind of internal electron donor used, the polymerization catalyst systems could either be (a) a monoester based catalyst system or (b) a diester based catalyst system.

Monoester based catalyst systems use monoester of aromatic carboxylic acids as internal electron donors. When a monoester based catalyst system is used, the polypropylene productivity is usually low to moderate and the polymers having relatively high polydispersity are formed. However, the extent of kinetic control achieved for the polymerization reaction, using such catalyst systems, is high, thus avoiding run away reactions leading to chunk formation. In most cases, monoester based catalyst systems provide polymerization reactions that are self extinguishing in nature i.e polymerization activity reduces with increasing temperature of the reaction.

Diester based catalyst systems typically use diester of aromatic carboxylic acids as internal electron donor. Polymer productivity using such catalyst systems is high. When diester based catalyst systems are used, polymers are usually formed with low polydispersity. It is, however, difficult to achieve adequate kinetic control of the polymerization reaction using such catalyst systems.

U.S. Pat. No. 5,414,063 describes a process for polymerization of propylene using a diester based catalyst system wherein a silane compound is used as the selectivity control agent. The process uses p-ethoxy ethyl benzoate as a killing agent to terminate the polymerization reaction. The use of killing agents to terminate the polymerization reaction would require that the polymerization reaction be continuously monitored either manually or by an automated control system. It is desirable that the polymerization reaction is terminated by itself so that such manual/auto controlled monitoring of the reaction progress could be avoided

SUMMARY OF THE INVENTION

Monoester based catalyst system and the process of the invention is based on the finding that when a catalyst system comprising ethyl-4-isopropoxy benzoate is used as the selectivity control agent for the polymerization of propylene, there is lowering of polydispersity of the polypropylene formed, improvement in the catalyst system productivity and reduction in the hydrogen consumption during polymerization while maintaining self-extinguishing characteristics of the catalyst system.

OBJECTS OF THE INVENTION

An object of the invention is to provide a monoester based catalyst system comprising ethyl-4-isopropoxy benzoate as the selectivity control agent for the polymerization of propylene Another object of the invention is to provide a process for polymerization of propylene in the presence of a catalyst system comprising ethyl-4-isopropoxy benzoate as the selectivity control agent to produce polypropylene with enhanced productivity and reduced hydrogen consumption Another object of the invention is to provide polypropylene having low polydispersity.

Another object of the invention is to provide a process for synthesis of an impact copolymer of propylene and ethylene with enhanced productivity and reduced hydrogen consumption in the presence of a catalyst system comprising ethyl-4-isopropoxy benzoate as the selectivity, control agent.

Yet another object of the invention is to provide an impact copolymer of ethylene and propylene having an impact strength in the range of 90 to 160 J/m and flexural modulus in the range of 1050-1300 MPa.

A further object of the invention is to provide a process for preparing oriented polypropylene tapes with improved tape line throughput from polypropylene synthesized by using the catalyst system of the invention.

A still further object of the invention is to provide oriented polypropylene tapes prepared from polypropylene synthesized by using the catalyst system of the invention

DETAILED DESCRIPTION OF THE INVENTION

It has been found that when a monoester based catalyst system comprising ethyl p-isopropoxy benzoate as the selectivity control agent is used for the polymerization of propylene, the polymerization reaction, apart from being self extinguishing, proceeded with high productivity and with low hydrogen consumption resulting in polypropylene having low polydispersity.

Accordingly, the invention provides a catalyst system for polymerization of propylene, the catalyst system comprising a Ziegler Natta procatalyst, an organoaluminium cocatalyst, a monoester of an aromatic carboxylic acid as the internal donor and ethyl-4-isopropoxy benzoate as the selectivity control agent.

In one embodiment. the invention provides a catalyst system for polymerization of propylene, the catalyst system comprising a Ziegler Natta procatalyst, an organoaluminium cocatalyst, a monoester of an aromatic carboxylic acid as the internal donor and ethyl-4-isopropoxy benzoate as the selectivity control agent and having a co-catalyst/pro-catalyst molar ratio in the range 40 to 260 and a co-catalyst/external donor molar ratio in the range of 2 to 5.

In another embodiment, the invention provides a process for polymerization of propylene in the presence of a catalyst system comprising a Ziegler Natta procatalyst, an organoaluminium cocatalyst, a monoester of an aromatic carboxylic acid as the internal donor and ethyl-4-isopropoxy benzoate as the selectivity control agent, at a temperature in the range of 60-80.degree. C. and at a pressure in the range of 5.0-32 kg/cm$^2$, the polymerization being characterised by increase in productivity and low hydrogen consumption.

In another embodiment, the invention provides a process for synthesis of an impact copolymer of propylene and ethylene in the presence of a catalyst system comprising a Ziegler Natta procatalyst, an organoaluminium cocatalyst, a monoester of an aromatic carboxylic acid as the internal donor and ethyl-4-isopropoxy benzoate as the selectivity control agent, at a temperature in the range of 50 to 100° C. and at a pressure in the range of 18 to 25 kg/cm$^2$ In another embodiment, the invention provides an impact copolymer of propylene and ethylene, the copolymer having impact strength in the range of 90 to 160 J/m and flexural modulus in the range of 1050-1300 MPa.

In a further embodiment, the invention provides a process for preparing oriented polypropylene tapes with improved tape production line throughput, the process comprising mixing polypropylene at 230-240° C. in an extruder to form a molten mass, converting the molten mass into a film, slitting the film to form a tape and stretching the tape along X and/or Y plane In a still further embodiment of the invention, there is provided oriented polypropylene tapes prepared from the polypropylene synthesized using the catalyst system of the invention.

The polymerization of propylene is carried out either in the bulk phase, slurry phase or in the gas phase. A Ziegler Natta pro-catalyst having $TiCl_4$ supported over $MgCl_2$ along with monoester of aromatic carboxylic acid is used for the polymerization reaction. Triethyl aluminium (TEAL) is used as the cocatalyst. The selectivity control agent, SCA (also known as the external donor) is added into the reactor along with the reactants and the pro-catalyst and co-catalyst. In certain experiments used for comparative purposes, the pro-catalyst to catalyst molar ratio or cocatalyst to selectivity control agent molar ratio have been varied in order to obtain polymer of same/comparable MFI and xylene solubility (X.S). The cocatalyst to procatalyst molar ratio is varied in the range of 40 to 260 and cocatalyst to selectivity control agent molar ratio is varied in the range of 2 to 5 depending on mode of polymerization In the polymerization reactions using the catalyst system of the invention comprising ethyl-4-isopropoxy benzoate, the productivity of polypropylene is significantly improved. The productivity of polypropylene varies in the range of 2-18 kg/gcat. Further, the hydrogen consumption during the polymerization is found to be low. The polypropylene products formed are found to have low polydispersity in the range of 5.5 to 6.0. Further, the polymerization reaction in the presence of the catalyst system of the invention is self extinguishing, ie, the polymerization reaction gets terminated on its own with increase in temperature during the reaction.

The catalyst system of the invention is also used to synthesize an impact copolymer of propylene and ethylene. The copolymerization is typically carried out at a temperature in the range of 50 to 100° C. and at a propylene pressure in the range of 18-25 $kg/cm^2$. Polymerization using the catalyst system of the invention provide impact copolymers having impact strength in the range of 90 to 160 J/m and flexural modulus in the range of 1050-1300 MPa with enhanced productivity in the range of 2 to 18 kgPP/gcat Polypropylene prepared by using the catalyst system of the invention is used to produce slit tape grade oriented polypropylene. The processing output of the tapes is dependent on the nature of polypropylene, especially on the molecular weight distribution as well as on the other mechanical properties of polypropylene. The catalyst system of the invention using ethyl 4-isopropoxy benzoate as the selectivity control agent provide polypropylene having improved stretchability and is therefore capable of yielding polypropylene tapes with enhanced output.

For the polymerization reactions described in the examples below, procatalyst having a composition of 2.8-3.4 wt % Ti, 17-18 wt % Mg and 14-16 wt % of internal donor (ethyl benzoate) were used. Polymer productivity of the catalyst was calculated based on polymer yield and catalyst amount. Hydrogen to propylene mole ratio in the reactor was determined by gas analyzer and hydrogen consumption was measured by standard mass flow meter. Melt flow index was obtained by standard MFI machine (of Kayeness Inc), xylene solubility was calculated by standard chemical solubility method and impact strength by izod-impact tester, CSI [Customer Scientific Instrument], USA and flexural modulus by Tensile-Flexrual Testing Machine, Llyod Instrument Polydispersity was obtained by using gel permeation chromatography instrument (Polymer laboratories Ltd). The plant output of slit tape grade polypropylene was calculated as kilogram of yarn produced per hour in slit tape plant. Line speed was measured in meter per minutes.

The invention is further illustrated by way of the following non limiting examples.

EXAMPLES

Example-1

Comparative Study of Slurry Phase Polymerization of Propylene by Catalyst Systems Comprising Ethyl-4-Ethoxy Benzoate or Ethyl-4-Isopropoxy Benzoate as Selectivity Control Agent $MgCl_2$ supported $TiCl_4$ catalyst (procatalyst) along with ethyl benzoate (internal donor), triethyl aluminium cocatalyst and ethyl-4-ethoxy benzoate or ethyl-4-isopropoxy benzoate (selectivity control agent) were added into a preheated moisture free stainless steel jacketed 5 L CSTR reactor containing a magnetic stirrer. n-hexane was used as solvent for polymerization. Procatalyst and cocatalyst were added in such amounts as to have a cocatalyst/procatalyst molar ratio of 40-260 and a cocatalyst/SCA molar ratio of 3-4. 240 ml of hydrogen was added into the reactor under ambient conditions. Propylene gas was introduced into the reactor, the reactor pressure was raised to 5.0-5.5 $kg/cm^2$ and the reactor temperature was raised to 68-72° C. Polymerization of propylene was carried out in the slurry phase for 1 hour maintaining reactor pressure of 5.0-5.5 $kg/cm^2$. After 1 hour of reaction, hexane was removed and polymer was collected/dried. Productivity of catalyst was calculated based on polymer yield and amount of catalyst used. The amount of catalyst was calculated following the standard titanium estimation method. The polymer productivity under the reaction conditions using ethyl-4-ethoxy benzoate or ethyl-4-isopropoxy benzoate as the selectivity control agent is displayed in Table 1.

TABLE 1

Slurry phase polymerization productivity using catalyst systems comprising ethyl-4-ethoxy benzoate or ethyl-4-isopropoxy benzoate as selectivity control agent

| Catalyst system | Slurry phase polymerization Productivity (kgPP/g cat) | TEAL/SCA molar ratio | X.S (wt %) | MFI (g/10 min) |
|---|---|---|---|---|
| Selectivity control agent: Ethyl-4-ethoxy benzoate | 4.7 | 4 | 3.4 | 3.0 |
| Selectivity control agent: Ethyl-4-isopropoxy benzoate | 5.5 | 3 | 3.5 | 3.0 |

From table 1, it can be seen that for the synthesis of polymers having comparable xylene solubility (XS) and Melt flow index (MFI), slurry phase polymerization productivity by the catalyst system comprising ethyl-4-isopropoxy benzoate as the selectivity control agent is higher by ~15%.

Example-2

Comparative Study of Gas Phase Polymerization of Propylene by Catalyst Systems Comprising Ethyl-4-Ethoxy Benzoate or Ethyl-4-Isopropoxy Benzoate as Selectivity Control Agents Gas phase polymerization of propylene was carried out with catalyst systems comprising 4-ethoxy ethyl benzoate or 4-isopropoxy ethyl benzoate as the selectivity control agent. Initially, SCA and triethyl aluminium cocatalyst were added into a 2 L CSTR type reactor. This was followed by addition of 11-12 mg of procatalyst at 35-55° C. and addition of required quantity of hydrogen. After this, propylene gas was introduced into the reactor. The procatalyst, cocatalyst and the selectivity control agent (SCA) were taken in such amounts as to have a cocatalyst to procatalyst (TEAL/Ti) ratio in the range of 55 to 60 and cocatalyst to selectivity control agent (TEAL/SCA) ratio of 2.3 to 2.5. Wherever required, the TEAL/Ti and/or TEAL/SCA ratio was adjusted so that polypropylene obtained by using both the selectivity control agents have same/similar MFI and xylene solubility. The RPM of the reactor was set to 650. The polymerization was carried out at 67° C. at a pressure of 26 kg/cm$^2$ for 1 hour (after the reaction pressure was reduced to 95%). After the reaction, the reactor was depressurized and polypropylene was collected. Using ethyl 4-ethoxy benzoate as the selectivity control agent, polypropylene having xylene solubility of 3.0 wt % and MFI of 1.3 g/10 min was obtained. Using ethyl 4-isopropoxy benzoate as the selectivity control agent, polypropylene having xylene solubility of 3.3 wt % and MFI of 1.3 g/10 min was obtained. The productivity and hydrogen consumption for the gas phase polymerization of propylene by catalyst systems comprising ethyl 4-ethoxy benzoate and ethyl 4-isopropoxy benzoate as selectivity control agents during gas phase polymerization of propylene are compared in table 2.

selectivity control agent under similar conditions. It could also be seen that the hydrogen consumption during the polymerization reaction for attaining polypropylene of comparable MFI is lower when selectivity control agent is ethyl-4-isopropoxy benzoate.

Further, when ethyl-4-isopropoxy benzoate is used as the selectivity control agent, polypropylene having low polydispersity is obtained. Polydispersity of polypropylene formed by using ethyl 4-isopropoxy benzoate was found to be lesser by a factor 1.0 less than the polypropylene obtained using the catalyst systems wherein ethyl 4-isopropoxy benzoate is used as the selectivity control agent.

Example-3

Comparative Study of the Formation of Impact Copolymer of Propylene and Ethylene by Catalyst Systems Comprising Ethyl-4-Ethoxy Benzoate and Ethyl 4-Isopropoxy Benzoate as Selectivity Control Agents The polymerization reaction leading to synthesis of the impact copolymer was carried out in two stages of a continuous process. In the first stage, polymerization of propylene was carried out in gas phase over a monoester catalyst slurry containing 35-40% procatalyst in mineral oil, 15-20% selectivity control agent selected from ethyl-4-ethoxy benzoate and ethyl-4-isopropoxy benzoate and 10% triethyl aluminium (cocatalyst) in cyclohexane, in a 15 m$^3$ first reactor. The first reactor pressure was maintained at 30-33 kg/cm$^2$ (having 70-75% propylene mole %). Bed weight of 15-25 kg and specific gas velocity of 0.32-0.35 m/s was maintained during the process. The cocatalyst to SCA ratio of 2-3 and cocatalyst/procatalyst molar ratio of 40-50 was maintained.

The second stage polymerization was carried out in a second reactor. During the second stage polymerization, resin from the first reactor was sent to the second reactor where ethylene and propylene in a molar ratio of 1:1 were reacted at a pressure of 22-25 kg/cm$^2$ over the residual catalyst sites in

TABLE 2

Productivity, hydrogen consumption and polydispersity during gas phase polymerization of propylene by catalyst systems comprising ethyl-4-ethoxy benzoate or ethyl-4-isopropoxy benzoate as selectivity control agents at same/similar TEAL/SCA and TEAL/Ti ratios

| Catalyst system | Polymerization Productivity (kgPP/gmcat) | Hydrogen consumption (mmole) | TEAL/ Procatalyst molar ratio | TEAL/ SCA molar ratio | Polydispersity | X.S (wt %) | MFI |
|---|---|---|---|---|---|---|---|
| Selectivity control agent: Ethyl-4-ethoxy benzoate | 7.0 | 30 | 63 | 2.5 | 6.8 | 3.4 | 1.4 |
| Selectivity control agent: Ethyl-4-isopropoxy benzoate | 9.3 | 20 | 58 | 2.3 | 5.8 | 3.3 | 1.3 |

When catalyst systems comprising ethyl-4-isopropoxy benzoate was used as the selectivity control agent, polypropylene was formed with a productivity of 9.3 kgPP/gm cat which is significantly higher than the productivity observed (7.0 kgPP/gcat) when ethyl-4-ethoxy benzoate is used as the the catalysts dispersed in the resin. Additional cocatalyst was also added in the second reactor to activate the catalytic sites. The polymerization performance by catalyst systems comprising ethyl-4-ethoxy benzoate or ethyl-4-isopropoxy benzoate as selectivity control agents are displayed in table 3.

TABLE 3

Productivity during two stage gas phase polymerization leading to the formation of impact copolymer by catalyst systems comprising ethyl-4-ethoxy benzoate(PEEB)/ethyl-4-isopropoxy benzoate(PIEB) as selectivity control agent

| Catalyst system | Gas phase polymerization Productivity (kgPP/g cat) | Cocatalyst/SCA molar ratio | $H_2/C_3$ Molar ratio in Reactor-1 | X.S (wt %) | $Fc^\dagger$ (wt %) | R1-MFI$^{\dagger\dagger}$ (gm/10 min) | R2-MFI$^{\dagger\dagger\dagger}$ (g/10 min) |
|---|---|---|---|---|---|---|---|
| Selectivity control agent: Ethyl-4-ethoxy benzoate | 2.0 | 45 | 0.115 | 2.6 | 20-22 | 17.0 | 7.5-8.5 |
| Selectivity control agent: Ethyl-4-isopropoxy benzoate | 2.4 | 45 | 0.084 | 2.6 | 20-22 | 17.0 | 7.5-8.8 |

$^\dagger$Quantity of ethylene propylene rubber incorporated in the propylene matrix.
$^{\dagger\dagger}$Melt Flow Index of the polymer formed after first stage polymerization
$^{\dagger\dagger\dagger}$Melt Flow Index of the polymer formed after second stage polymerization It is clear from table 3 that the productivity of impact copolymer formed by using a catalyst system comprising ethyl-4-isopropoxy benzoate as the selectivity control agent is 10-15% higher compared to the catalyst system comprising ethyl 4-ethoxy benzoate as the selectivity control agent, in the polymerization reactions where impact copolymers having similar xylene solubility, rubber content, and melt flow index are formed.

Example 4

Test for Self Extinguishing Property of the Catalyst System

The polymerization of propylene was carried out in a fluidized bed reactor using the procatalyst, cocatalyst and using ethyl-4-isopropoxy benzoate as the selectivity control agent. The fluidized conditioned reactor bed was stabilized for an MFI of 3 gm/10 min and XS of 3 wt % homopolypropylene. The fluidization was stopped along with catalyst, co-catalyst (TEAL) and ethy 4-isopropoxy benzoate. The bed temperature increased (due to exothermicity of the reaction) to a maximum 86° C. After 2 hrs, fluidization was started again and start-up was found normal indicating no chunk formation during the process indicating the absence of run away reaction and proving that the polymerization was self extinguished in the presence of the catalyst system of the invention.

Example 5

Preparation of Oriented Polypropylene Tapes

Polypropylene was mixed and melted at 230-240° C. and extruded into films which was quenched with water and then slitted into tapes. The tape was oriented by stretching and then by annealing. Finally it is wound on a roller.

A line speed of 340 rpm and screw rpm of 93 were used to obtain the tapes on Lorex made spilt tape plant. Plant output of the oriented tapes using polypropylene produced using catalyst system having Ethyl 4-isopropoxy benzoate as SCA had shown 364 kg/hr out put while plant output of the oriented tapes prepared, without any tape breakage, from polypropylene synthesised by using catalyst system having Ethyl 4-ethoxy benzoate was found to be 354 kg/hr output, under identical conditions.

Thus, oriented polypropylene tapes produced using polypropylene synthesized by the catalyst system comprising ethyl-4-isopropoxy benzoate showed significant improvement (improvement by 3-4%) in plant output as compared to the polypropylene tapes prepared from polypropylene synthesized by using catalyst system comprising ethyl-4-ethoxy-benzoate as the SCA The invention thus provides an improved catalyst system for polymerization of propylene by a catalyst system comprising ethyl-4-isopropoxy benzoate as the selectivity control agent. The catalyst system provides polypropylene and impact copolymer of propylene and ethylene with improved productivity. Improved productivity for polymerization would reduce the catalyst and cocatalyst consumption during the polymerization process. Apart from this, the catalyst system of the invention enables to carry out polymerization at low hydrogen consumption. Thus, the process efficiency of the polymerization reaction is improved. Moreover, the polymerization process of the invention results in polymers having low polydispersity. This in turn increases the plant throughput during the production of polypropylene tapes.

The above description is illustrative only and is not limiting. The present invention is defined by the claims which follow and their full range of equivalents

The invention claimed is:

1. A catalyst system for the polymerization of propylene having a polymerization productivity of at least 2 kgPP/gcat and yielding polymers having a polydispersity index of less than 6, the catalyst system comprising a Ziegler-Natta procatalyst, an organoaluminium cocatalyst, ethyl benzoate as an internal donor and ethyl-4-isopropoxy benzoate as a selectivity control agent, wherein the cocatalyst to procatalyst molar ratio is in the range of 40 to 260 and the molar ratio of cocatalyst to selectivity control agent is in the range of 2 to 5.

2. A process of polymerizing propylene comprising polymerizing propylene in the presence of the catalyst system of claim 1 at a temperature in the range of 60-80° C. and at a pressure in the range of 5.0-32 $kg/cm^2$.

3. The process according to claim 2 wherein the process is carried out in the gas phase, in the bulk phase, or in the slurry phase.

4. A process of synthesizing an impact copolymer of propylene and ethylene comprising polymerizing propylene and ethylene in the presence of the catalyst system of claim 1 at a temperature in the range of 50 to 100° C. and at a pressure in the range of 18 to 25 kg/cm$^2$.

5. A process of preparing oriented polypropylene tapes comprising polymerizing propylene in the presence of the catalyst system of claim 1 at a temperature in the range of 60 to 80° C. and a pressure in the range of 5.0 to 3.2 kg/cm$^2$ to obtain a polypropylene having a polydispersity in the range of 5.5 to 6.0, mixing the polypropylene at 230 to 240° C. in an extruder to form a molten mass, forming the molten mass into a film, slitting the film to form a tape, and stretching the tape along the x and/or y plane to form an oriented polypropylene tape.

* * * * *